Feb. 6, 1968          R. H. BIERI          3,367,190
HERMETICALLY SEALING WATER SAMPLER
Filed Dec. 30, 1965                2 Sheets-Sheet 1

INVENTOR.
RUDOLPH H. BIERI
BY
ATTORNEY.

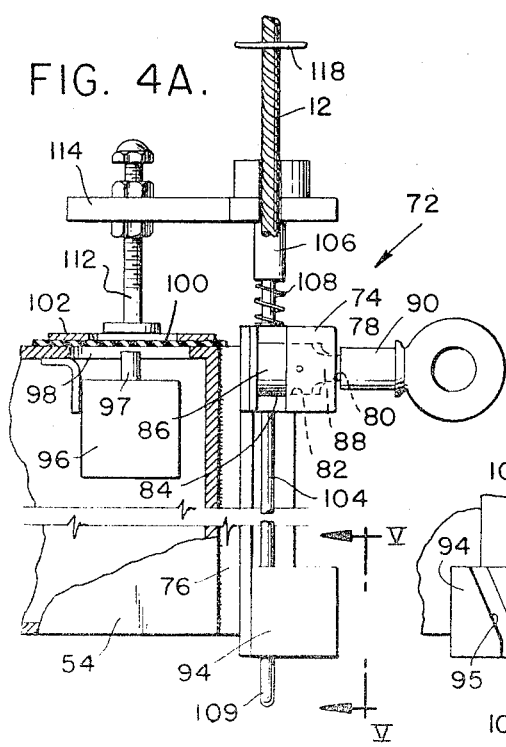
FIG. 4A.
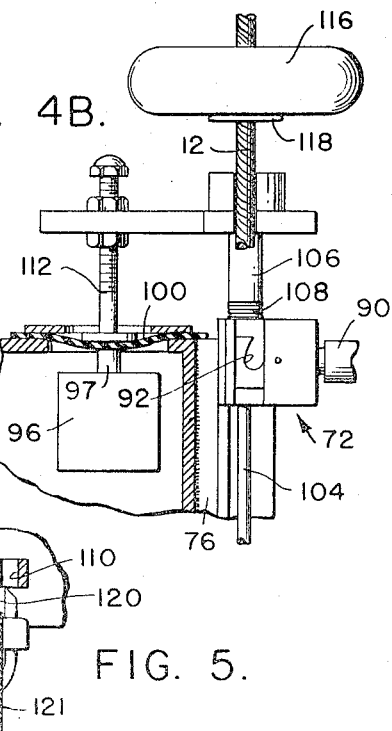
FIG. 4B.
FIG. 5.
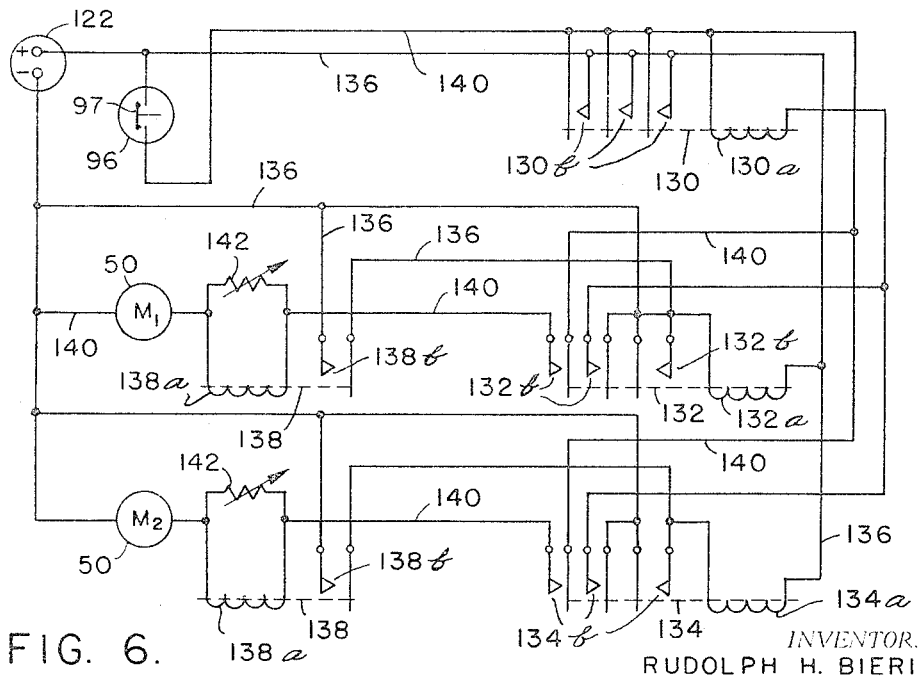
FIG. 6.
INVENTOR.
RUDOLPH H. BIERI
BY Ervin A. Johnston
ATTORNEY.

United States Patent Office 3,367,190
Patented Feb. 6, 1968

3,367,190
HERMETICALLY SEALING WATER SAMPLER
Rudolf H. Bieri, Del Mar, Calif., assignor, by mesne assignments, to the United States of America as represented by the Secretary of the Navy
Filed Dec. 30, 1965, Ser. No. 517,862
10 Claims. (Cl. 73—425.4)

ABSTRACT OF THE DISCLOSURE

The description discloses a water sampler for obtaining a hermetically sealed sample of water at a selected depth. The sampler may be supported at such depth by a cable. The sampler includes an open tube and means for pinching the ends of the tube at a selected time so that water within the tube is trapped at the selected depth. The sampler along with the tube may then be retrieved and the gaseous content within the water will be representative of the gas content at the selected depth.

---

The invention described herein may be manufactured and used by or for the Government of the United States of America for governmental purposes without the payment of any royalties thereon or therefor.

The present invention relates to a hermetically sealing water sampler and more particularly to a water sampler for obtaining a hermetically sealed sample of water within a tube at a selected depth.

Over the past few years there has been an increasing interest in the assay of dissolved gas concentrations in sea water. Sea water samples are required from many various depths within the sea, some of which exceed 12,000 feet. It can be readily appreciated that in view of the tremendously high pressures involved that a water sampling device must have the capability of making a rigid and perfect seal of the water sample within some sort of enclosure. If this seal is not maintained the dissolved gases will escape the sample as the sample is ascended into lower pressures toward the surface of the water. There is an urgent need for a water sampling device which will obtain water samples from great depths within the ocean without any change in the dissolved state of the gases within the water sample. Prior art water sampling devices have suffered from two inherent disadvantages, namely, (1) bubbles form from the dissolved gases as a result of vibrations within the hydrographic cable or through the warming of the sample container as it is ascended from the ocean depths, and (2) air is trapped in the apparatus and retained with the water to be analyzed.

The present invention overcomes the aforementioned disadvantages of the prior art devices by providing a water sampler which obtains a hermetically sealed sample of water even at depths over 12,000 feet. The present water sampler seals a sample of water in such a manner that air is not trapped in the same area with the water sample nor is there any release of pressure to allow bubble formation and loss of dissolved gases as the sample is ascended. The present water sampler offers another important advantage in that it is compatible with standard extraction devices for assaying the dissolved gas concentrations. The present invention utilizes a tube for enclosing the water sample. The tube is of such a size that it can be directly connected to the extraction device for the transfer of the water sample without any loss of the dissolved gases.

In addition to the tube the water sampler includes: a pair of pinch blocks, each of which has an opening for receiving a tube; means for retaining the pinch blocks in a spaced apart aligned relationship; at least one pinch element slidably disposed in each pinch block for pinching the tube to a sealed closure at two locations therealong; means for driving each pinch element against the tube; means for selectively actuating the driving means; and means for releasably fixing the driving means and pinch blocks at a selected location along an oceanographic cable.

An object of the present invention is to provide a water sampler which overcomes all of the aforementioned disadvantages of prior art water samplers.

Another object is to provide a water sampler for obtaining a hermetically sealed sample of water at depths below 12,000 feet.

A further object is to provide a water sampler which provides a sealed sample of water free from entrapped air, and from bubble formation due to the dissolved gases as the sample is ascended within the water.

Still another object is to provide an easily operable and reliable water sampler which will provide a sample of water hermetically sealed within a tube which is compatible with standard gas extraction devices.

Other objects, advantages and novel features of the invention will become apparent from the following detailed description of the invention when considered in conjunction with the accompanying drawings wherein:

FIG. 4A is a side view of a portion of the water sampler as seen generally along plane IV—IV of FIG. 2 prior to the switch being actuated by a messenger;

FIG. 4B is the same view as FIG. 4A except the switch is shown actuated by the messenger;

FIG. 5 is a view taken generally along plane V—V of FIG. 4A; and

FIG. 6 is a schematic illustration of the circuitry for operating a pair of motors utilized in the water sampler.

Figure 1:
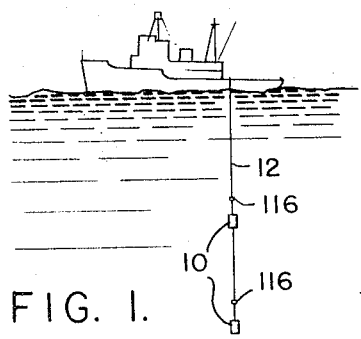
FIG. 1 is a side view of a plurality of water samplers consecutively clamped to an oceanographic cable from a surface vessel.
Figure 2:
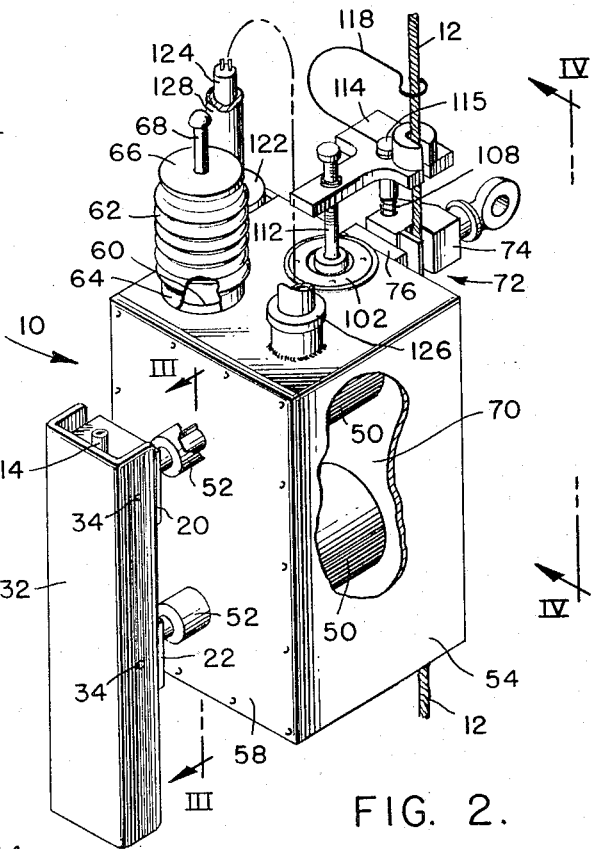
FIG. 2 is an isometric view of the water sampler with portions cut away to illustrate the details of the device.
Figure 3:
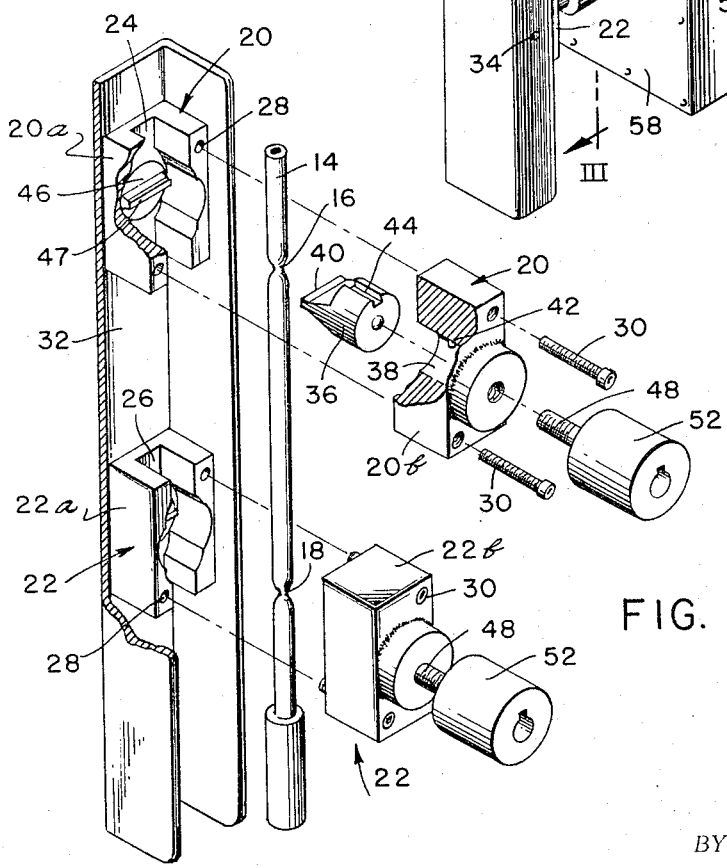
FIG. 3 is an exploded isometric view of the tube pinching assembly looking generally along plane III—III of FIG. 2.

Referring now to the drawings wherein like reference numerals designate like or similar parts throughout the several views, there is shown in FIG. 2 the sea water sampler 10 clamped to an oceanographic cable 12. As shown in FIG. 1, several sea water samplers can be strung on an oceanographic cable from a surface vessel. The water sampler 10 is adapted to obtain a hermetically sealed sample of water at a depth where the water sampler is clamped to the oceanographic cable 12. The water sample is obtained within a tube 14 which may be constructed of metal. The tube 14, as shown in FIG. 3, has been pinched along its length at upper and lower locations 16 and 18 respectively. The pinching of the tube 14 at locations 16 and 18 hermetically seals a sample of water therebetween. This is the condition of the tube after the sea water sampler 10 has performed its operation.

The tube 14 is pinched at the locations 16 and 18 by a crimp or pinch assembly as shown in FIG. 3. The pinch assembly includes a pair of identical pinch blocks 20 and 22, each of which has a vertical opening 24 and 26 respectively for receiving the sampling tube 14. Each of the pinch blocks 20 and 22 may be divided into two parts, the block 20 being divided into a tube receiving part 20a and a closure part 20b, and the block 22 being divided in the same manner into a receiving part 22a and a closure part 22b. Each of the receiving parts 20a and 22a may have transverse holes 28 for receiving projections 30 on the closure blocks 20b and 22b so as to mate the divided parts of the blocks into a proper aligned relationship. Bolts 32 may extend through the receiving block parts 20b and 22b into the tube receiving block parts 20a and 22a to retain the block parts as this aligned relationship. It is also desirable that the pinch blocks 20 and 22 be aligned with their openings 24 and 26 one above the other along the length of the tube 14. A suitable means for retaining the pinch blocks with their openings 24 and 26 in this spaced apart aligned relationship may be a rigid bar such as a channel 32 which is fixed to the tube receiving block parts 20a and 22a by bolts 34.

At least one pinch element 36 is slidably disposed in each pinch block 20 and 22 for pinching the tube 14 to a sealed closure at the two locations 16 and 18. Each of the pinch elements 36 may be generally cylindrical in shape and slidable within a cylindrical bore 38 within the respective closure block parts 20b and 22b. Each of the cylindrical pinch elements 36 has a projection which forms a substantially straight pinching edge 40 which is adapted to make direct contact with the tube 14. An inwardly projecting stud 42 may be provided within the cylindrical bore 38 of each of the closure block parts 20b and 22b which registers with a respective longitudinal groove 44 within the cylindrical wall of the pinch elements 36 for positioning the pinching edges 40 substantially transverse the longitudinal axis of the tube 14.

Each pinch block 20 and 22 may have a second pinch element 46 mounted therein within the tube receiving block parts 20a and 22a respectively. These second pinch elements 46 may be generally cylindrical in shape with a projection forming a substantially straight pinching edge 47. The cylindrical portion of the second pinch element 46 may be recessed within a cylindrical bore within each of the tube receiving block parts 20a and 22a and fixed therein by spot welding so as to position the pinching edge 47 substantially transverse the longitudinal axis of the tube 14 and opposite from the pinching edge 40 of a respective one of the sliding pinch elements 36.

A means is provided for driving the slidable pinch elements 36 against the tube 14 to hermetically seal the tube at locations 16 and 18. The drive means may include a bolt 48 which is threaded into a respective one of each of the closure block parts 20b and 22b in alignment with the longitudinal axis of a respective one of the slidable pinch elements 36 so that when the bolt 48 is screwed inwardly it will engage the slidable pinch element 36 and force it against the tube 14. Operatively connected to each bolt 48 is a respective gear motor 50 for screwing the bolts 48 in the respective pinch blocks. The motors 50 may be connected to the bolts 48 by drive sleeves 52 which are keyed at one end to the outward shafts of the motors 50 and fixed to the heads of the bolts 48 at the other end by any suitable means such as spot welding. The circuitry and power source for the motors 50 will be described in detail hereinafter.

A means is provided for releasably fixing the driving means and the pinch blocks 20 and 22 at a selected depth along the oceanographic cable 12. The releasable fixing means may include a means for supporting the motors 50 as well as a means connected to the motor supporting means for clamping the motor supporting means to the cable 12. The motor supporting means may include a container 54 which has a lid 58. The lid may be provided with an O-ring (not shown) which makes a seal when the lid is tightly screwed to the container, as shown in FIG. 2. This will seal the motors 50 in the container from the outside water environment. The container 54 has a flanged opening 60 in its top end wall. A bellows 62 is mounted to the container 54 at the opening 60 with the bottom portion of the bellows encircling the flange of the opening and sealed thereto by a clamp 64. A top portion of the bellows is sealably clamped in a similar manner to a cylindrical member 66 which has an upwardly extending handle 68 for manually expanding or retracting the bellows 62. The container 54 and the bellows 62 in its expanded position are completely filled with a dense fluid such as oil prior to lowering the container within the water. In this manner as the container 54 is lowered in the water the increasing pressure will act upon the bellows 62 to compress the oil 70 within the container to maintain and equalize the oil pressure with the outside water pressure. This enables the container 54 to be constructed of reasonably light materials since is does not have to withstand the tremendous deep ocean water pressures.

The means for clamping the container 54 to the oceanographic cable 12 may be a clamp 72, as best illustrated in FIG. 4A. The clamp 72 may include a clamping block 74 which is rigidly connected to a bar 76 which in turn is rigidly connected to a backside of the container 54. These rigid connections may be made by any suitable means such as spot welding. The clamping block 74 has a vertical groove 78 for receiving the oceanographic cable. Transverse the vertical groove 78, the clamping block 74 has a cylindrical bore 80 and a counterbore 82 for receiving a clamping element 84. The clamping element 84 has an enlarged cylindrical portion 86 slidably received within the counterbore 82 and a reduced cylindrical portion 88 slidably received within the cylindrical bore 80 so that the clamping element 84 is capable of sliding transverse the oceanographic line 12. The reduced cylindrical portion 88 of the clamping element 84 extends beyond the clamping block 74 where a nut 90 is threaded thereon. The enlarged cylindrical portion 86 of the clamping element is provided with a vertical groove 92 for receiving the oceanographic cable 12 so that when the nut 90 is tightened the cable is drawn tightly against the clamping block 74 within its vertical groove 78, thereby holding the water sampler tightly in position at a selected location on the oceanographic cable 12. In order to retain the bottom end of the container 54 against the oceanographic cable 12, a retaining block 94 may be provided which is rigidly connected to the bar 76 by any suitable means such as spot welding. As shown in FIG. 5, the retaining block 94 may have a slanted groove 95 for receiving the oceanographic cable 12 and providing a wedging action thereagainst when the weight of the water sampler is applied.

It is desirable that a means be provided for selectively actuating the motors 50. The actuation means may include a push button type switch 96 which is mounted within the container 54 by any suitable means, such as welded brackets, with the button 97 facing upwardly and outwardly with respect to the container and in the proximity of the top end wall thereof. As shown in FIG. 4A, the top end wall of the container 54 may be provided with an opening 98 with the button 97 extending slightly therethrough. A resilient neoprene diaphragm 100 is sealed across the opening 98 by an annular ring 102 which is screwed into the top end wall of the container 54 tightly against the diaphragm. The diaphragm 100 should be sufficiently flexible so that the push button 97 can be pushed to actuate the switch. A rod 104 slidably extends through vertical passageways within the clamping block 74 and the retaining block 94 so that the rod 104 is free to move substantially parallel to the movement of the push button 97. The rod 104 has an enlarged cylindrical portion 106 at its top and a compression spring 108 is disposed on the rod between this cylindrical portion 106 and the top of the clamping block 74. In this manner the rod 104 is biased in an upward direction. A bottom end 109 of the rod is curved 180° and extends within a vertical passageway 110 of the retaining block 94 so as to limit the upward movement of the rod 104. A push rod 112 is disposed over the push button 97 and is in axial alignment therewith for pushing the button 97. The push rod 112 is held in this position by a crossbar 114 which is connected to both the rod 104 and the push rod 112. The crossbar 114 may be connected to the rod 104 by a nut 115 which is threaded on the top of the rod and the crossbar may be connected to the push rod 112 by nuts threaded on the push rod at the top and the bottom of the crossbar. Accordingly, when the rod 104 is pushed downwardly against the action of the spring 108, the push rod 112 is also moved downwardly against the diaphragm 100 to push the push button 97. This operation will actuate the switch 96.

The rod 104 may be pushed downwardly to actuate the switch 96 by a messenger 116, as shown in FIG. 4B, which is no more than a weight which is slidable down the oceanographic cable 12. In order to extend the duration of the force applied to the push button 97 by the messenger 116, an arcuate spring wire 118 which is curved approximately 180° may be fixed at one end to the rod 104 by the nut 115 and have its other end looped around the oceanographic cable 12. Accordingly, as the messenger 116 initially strikes the top of the spring wire 118 a force is applied to the push button 97 which continues until after the messenger is carried by the force of the spring 118 or strikes the top of the crossbar 114. Switch 96 is shown in FIG. 4A prior to its actuation and in FIG. 4B is shown after it is actuated by the weight of the messenger 116.

The retaining block 94 may be provided with a transverse notch which intersects the vertical passageway 110. The rod 104 may extend slightly above this notch when the rod is in its fully upward position so that an enclosure 120 is provided between the rod and the retaining block 94. This will enable a line 121 from another messenger (not shown) to be looped within the closure 120 and retained until such time as the rod 104 is pushed downwardly by the messenger 116, as shown in FIG. 4B. When the rod 104 is pushed downwardly the enclosure 120 is open and the line of the other messenger will slip outwardly therefrom to release the messenger to travel down the oceanographic cable 12 to the next water sampler.

The motors 50 may be powered by a battery pack 122 which is mounted to a side of the container 54 by any suitable means such as brackets (not shown). The battery pack 122 may be connected to the motors 50 by an electrical cable 124 which extends upwardly from the battery pack 122 and is then curved downwardly into the container 54 through a flanged opening 126. The electrical cable may be protected against the water environment by neoprene tubular shielding 128 which is sealed to the battery pack 122 and to the flange opening 126.

In order to make a hermetic seal of the water sample within the tube 14 at the locations 16 and 18 it is desirable that the material of the tube 14 not be damaged during the pinching process. I have found that a satisfactory material for the tube 14 is either aluminum or copper. When the tube is constructed of metal it is important that the bearing strength of the metal not be exceeded during the pinching process because of the likelihood of an opening being made into the water sample area. Accordingly, I have provided a means for stopping the motors after the tube 14 has been hermetically sealed and before the bearing strength of the metal of the tube is exceeded. This means may include the circuitry shown in FIG. 6. The circuitry may include three longitudinal solenoids 130, 132 and 134 which have coils 130a, 132a and 134a and sets of contacts 130b, 132b and 134b respectively. The longitudinal solenoids 132 and 134 may be identical with a pair of sets of contacts in a normally closed position and one set in a normally open position. The longitudinal solenoid 130 has all of its sets of contacts in a normally open position. The coils 132a and 134a may be connected between the plus and minus terminals of the battery pack 122 by a line 136. This line is normally interrupted by contacts 138b of a longitudinal solenoid 138 which will be described in more detail hereinafter. This line is also connected to one of the contacts in each of the set of contacts 130b.

The motors 50 are connected between the plus and minus terminals of the battery pack 122 by a line 140. The line 140 is normally broken by the switch 96 and passes through one of the normally closed set of contacts 132b and 134b. This line is also connected to one of the contacts of each of the set of contacts 130b. Interposed in the line 140 before each motor 50 is a coil 138a of the longitudinal solenoid 138 and a variable resistor 142 which are connected in parallel with respect to one another. The coil 138a will close the contacts 138b when the current in the coil 138a reaches a particular amount. The variable resistors 142 are adjusted so that when the motors 50 have applied sufficient torque to hermetically seal the tube 14, the coils 138a will receive the sufficient current to close the contacts 138b prior to the bearing strength of the metal of the tube 14 being exceeded. The circuitry may be mounted on a circuit board (not shown) which is in turn mounted in the container 54.

In the operation of the circuitry shown in FIG. 6 when the push button 97 is pushed current is applied to the coil 130a which closes the contacts 130b. Current then flows through line 136 through the contacts 130b and to the coil 130a through the line 140 to hold the contacts 130b in the closed position after the push button is released. The current through the line 136 at this time has no effect on the condition of the contacts of the longitudinal solenoids 132 and 134 since the contacts 138b are still in the open position. Current now flows through the line 140 through the normally closed contacts 132b and 134b and through the coils 138a and the variable resistors 142 to operate the motors 50. This operation brings about the pinching of the tube 14 at the locations 16 and 18. When the tube 14 is sufficiently pinched the current within the coils 138a rises to such an amount that the contacts 138b are closed to close the circuit to the coils 132a and 134a. When this circuit is closed the longitudinal solenoids 132 and 134 operate to open the normally closed sets of contacts thereof and close the normally open set of contacts thereof. This breaks the line 140 and the circuit to the motors 50 so that they will stop. This action also continues the current through the coils 132a and 134a for a positive functioning of the circuit after the contacts 138b open once again. The tube 14 has now been pinched in just the desired amount at locations 16 and 18.

In the operation of the water sampler 10 the pinch assembly is assembled in the manner shown in FIG. 3 with the water sampling tube 14 extending through the openings 24 and 26 of the pinch blocks 20 and 22 respectively. In order to retain the tube 14 in position the bolts 48 should be tightened sufficiently within the blocks 20 and 22 so that the pinching edges 40 of the pinching elements 44 hold the tube firmly against the opposite pinching edges 47 of the other pinching elements 46. In this manner the tube 14 is frictionally held between the pinching elements. Alternatively, a rubber tube (not shown) having an external diameter larger than the opening 24 could be slipped over the top of the tube 14 so as to hold it in position. The water sampler 10 is positioned on the oceanographic cable 12 by the clamp 72 and the retaining block 94 so that when the cable 12 is paid out from the ship, as shown in FIG. 1, the water sampler 10 will be at a desired depth for obtaining a water sample. A number of the samplers 10 may be strung on the oceanographic cable 12 as shown in FIG. 1 so as to obtain water samples at various depths. When it is desired to actuate the water sampler 10 the messenger 116 is dropped from the surface vessel along the oceanographic cable 12. When the messenger strikes the arcuate spring wire 118 the switch 96 is actuated to operate the motors and hermetically seal off the tube 14 as described above.

It is now readily apparent that the present invention provides a reliable apparatus for hermetically sealing a water sample so as to prevent the escape of any dissolved gases. The water sampler is reliable in its operation and encloses the water sample in such a form that it can be easily transferred to existing gas extraction apparatus. The manner of sealing the motors 50 and the circuitry shown in FIG. 6 within the container 54 has obviated the requirement of making the container 54 of the high pressure type. Further, the actuating means has enabled the water sampler to be operated by the simple operation of dropping a messenger along the oceanographic cable.

I claim:

1. A water sampler for obtaining a hermetically sealed sample of water at a selected depth comprising:
   an open tube;
   a pair of pinch blocks, each of which has a passageway for receiving said tube;
   means for retaining the pinch blocks with their openings in a spaced apart aligned relationship;
   at least one pinch element slidably disposed in each pinch block for pinching the tube to a sealed closure at two locations therealong;
   means for driving each pinch element against the tube;
   means for selectively actuating said driving means; and
   means for releasably fixing the driving means and pinch blocks at a selected location along an oceanographic cable.

2. A water sampler as claimed in claim 1 wherein:
   each pinch block is divided into two parts;
   a first part of each pinch block slidably receiving a pinch element and having an inward projection; and
   each of the slidable pinch elements having a substantially straight pinching edge and a groove which registers with the inward projection and positions the pinching edge substantially transverse said tube.

3. A water sampler as claimed in claim 2 including:
   a second pinch element mounted in each pinch block to its second part; and
   each second pinch element having a substantially straight pinching edge which is positioned substantially transverse said tube and opposite from the pinching edge of the respective slidable pinch element.

4. A water sampler as claimed in claim 1 wherein:
   the means for retaining the pinch blocks in a spaced apart aligned relationship is a rigid bar connected to each pinch block.

5. A water sampler as claimed in claim 1 wherein the means for driving each pinch element against the tube includes:
   a bolt threaded within each pinch block and adapted to engage a respective pinch element; and
   a gear motor connected to each bolt.

6. A water sampler as claimed in claim 5 wherein:
   said tube is constructed of metal; and including
   means for stopping said motor after the tube is sealed and before the bearing strength of the metal is exceeded.

7. A water sampler as claimed in claim 1 wherein:
   the means for releasably fixing the driving means at a selected location along the oceanographic cable includes:
   means for supporting the driving means; and
   means connected to the support means for clamping the support means to said cable.

8. A water sampler as claimed in claim 7 wherein:
   the means for supporting the driving means is a container which contains said driving means; and including
   said container having an opening; and
   a bellows mounted to the container at said opening whereby pressure within the container is equalized with water pressure as the water sampler descends in the water.

9. A water sampler as claimed in claim 8 wherein:
   the container is filled with oil.

10. A water sampler as claimed in claim 8 wherein the means for selectively actuating said driving means includes:
    a push button switch mounted within said container with the button facing outwardly with respect to the container;
    said container having an opening adjacent the switch button and a resilient diaphragm sealed across said opening, said diaphragm flexing sufficiently to enable the switch to be actuated from the exterior of the container;
    a rod slidably mounted through the clamping means;
    a push rod for pushing the switch button through said diaphragm; and
    a crossbar connecting the push rod to the slidable rod.

References Cited

UNITED STATES PATENTS 2,314,372  3/1943  Spilhaus _____ 73—425.4
3,250,130  5/1966  Lozano _____ 73—422

LOUIS R. PRINCE, *Primary Examiner.*

S. C. SWISHER, *Assistant Examiner.*